Figure 3:
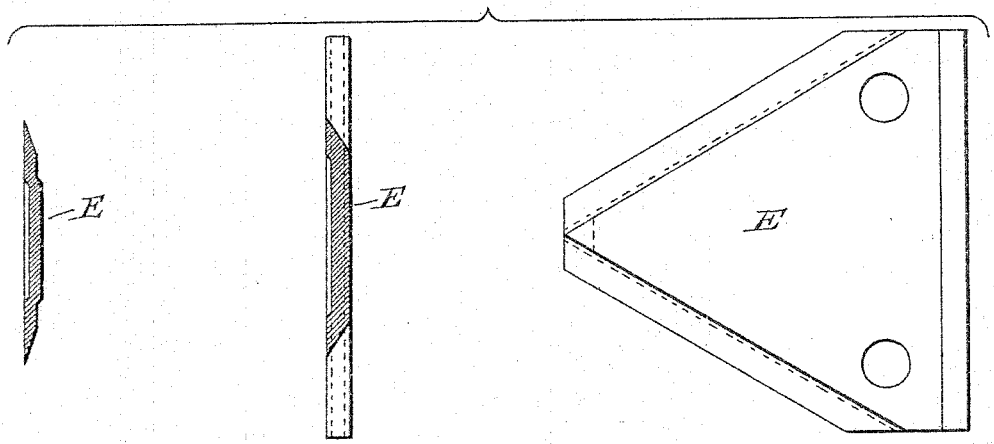

(No Model.) 2 Sheets—Sheet 1.
W. ST. G. ELLIOTT & W. ST. G. ELLIOTT, Jr.
CUTTING APPARATUS FOR MOWERS OR REAPERS.
No. 491,340. Patented Feb. 7, 1893.
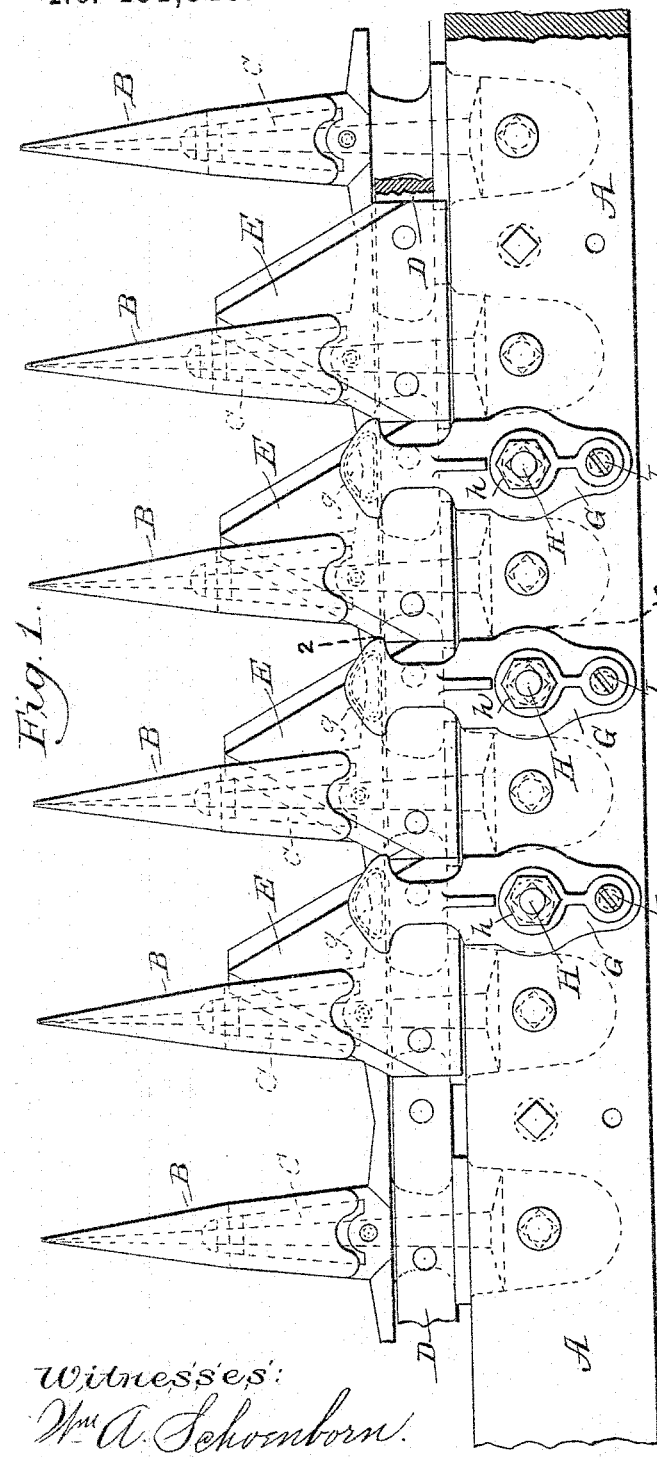
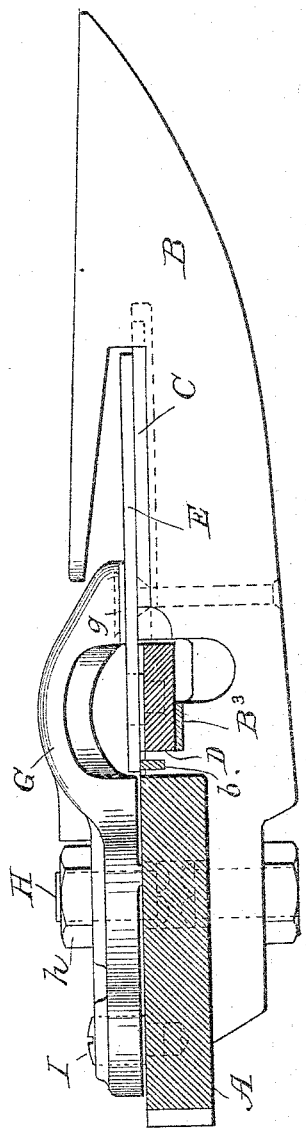
Witnesses:
Wm. A. Schoenborn
Arthur E. Sowell
Inventors:
Wm. St. George Elliott &
Wm. St. George Elliott Jr.
By J. H. Alexander
atty (No Model.) 2 Sheets—Sheet 2.

W. ST. G. ELLIOTT & W. ST. G. ELLIOTT, Jr.
CUTTING APPARATUS FOR MOWERS OR REAPERS.

No. 491,340. Patented Feb. 7, 1893.

Witnesses:
Wm A. Schoenborn.
Arthur E. Dowell.

Inventors:
Wm St. George Elliott &
Wm St. George Elliott Jr.
By J. K. Alexander

THE NORRIS PETERS CO., PHOTO-LITHO., WASHINGTON, D. C.

UNITED STATES PATENT OFFICE.

WILLIAM ST. GEORGE ELLIOTT AND WILLIAM ST. G. ELLIOTT, JR., OF WASHINGTON, DISTRICT OF COLUMBIA.

CUTTING APPARATUS FOR MOWERS OR REAPERS.

SPECIFICATION forming part of Letters Patent No. 491,340, dated February 7, 1893.

Application filed January 19, 1892. Serial No. 418,566. (No model.)

*To all whom it may concern:*

Be it known that we, WILLIAM ST. GEORGE ELLIOTT and WILLIAM ST. GEORGE ELLIOTT, Jr., of Washington, in the District of Columbia, have invented certain new and useful Improvements in Cutting Apparatus for Mowers or Reapers; and we do hereby declare that the following is a full, clear, and exact description thereof, reference being had to the accompanying drawings, and to the letters of reference marked thereon, which form part of this specification.

This invention is an improvement in the cutting apparatus of reaping and mowing machines, and its principal object is to insure a shear cut by the knives, and between each knife and its ledger plate or edges of guard fingers; secondary objects are to make the knives both removable and self sharpening, and to provide means whereby the knives are independently retained on the bar, and independently adjusted, so that a shear cut is thereby effected, keeping the ledger plates and knives sharp by reason of their frictional contact, yet without retarding or straining the cutter bar by reason of the irregularities in the height or positions of different knives thereon, or ledger plates or fingers; nor will any great amount of friction be engendered between the moving and stationary parts. Each knife in other words is to be provided with an independent adjusting device by which it is kept in contact with its co-acting knife, ledger plate or guard finger, with any degree of tension required so that its cutting edges impinge against and rest upon the edges of the ledger plates or fingers thereby insuring a shear cut and preventing choking of the bar by stalks, grass &c., crowding in between the knives and fingers.

The invention therefore consists in the novel construction and combination of parts hereinafter clearly described and claimed.

In the ordinary cutting apparatus of reaping and mowing machines employing a reciprocating cutter bar the knives have been generally rigidly connected to the bar, though sometimes made removable, hence the knives generally instead of making a shear cut with the edges of the ledger plates, spring out of shearing contact with the plates and consequently cut the grain, stalks and blades, by direct severing stroke, or by crowding them against the fingers and then breaking through them. The edges of the knives are dulled very quickly in such cases and tend to drag the stalks between the fingers and knives, clogging the latter and increasing the strain on the cutting apparatus to an injurious degree, and eventually disabling the machine until the knives are removed and sharpened. With the knives rigidly connected to the bar it is laborious and time consuming to remove them, and it is almost equally as time consuming to attempt to sharpen them on the bar. It is found that where the knives and ledger plates do contact, the knife edges are kept sharp for two reasons, first; because a shear cut is produced, and, second; because the frictional contact between the knife and ledger plates slightly wears the metal maintaining a keen edge thereon.

It is almost practically impossible to make and retain the edges of the ledger plates in the same horizontal plane, as the fingers are warped and sprung out of position by use, and hence we find it is desirable in order to overcome the difficulties to provide means for independently keeping each cutter blade or knife in shearing contact with its coacting knife, ledger plate or guard finger, and we also find it desirable in order to render the knives readily adjustable to allow each a slight vertical play or oscillation on the bar, so that it can adjust itself to and with the plane of its coacting ledger plates.

It is desirable to provide an independent presser or adjuster for each knife, whether solidly attached to bar or not, so that each knife can be adjusted independently of the bar, thus enabling us to equalize the contact and friction between the several knives and ledger plates; and for convenience in sharpening and repairing to make each knife readily detachable from the bar, and without bolting or riveting it thereto to connect it securely therewith so as to be reciprocated thereby. These essentials we have provided for in our improved cutter bar which we will now describe.

Figure 4:
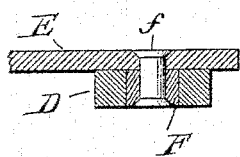
Figure 5:
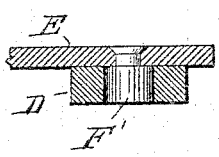
Figure 6:
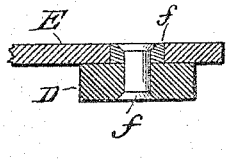
Figure 7:
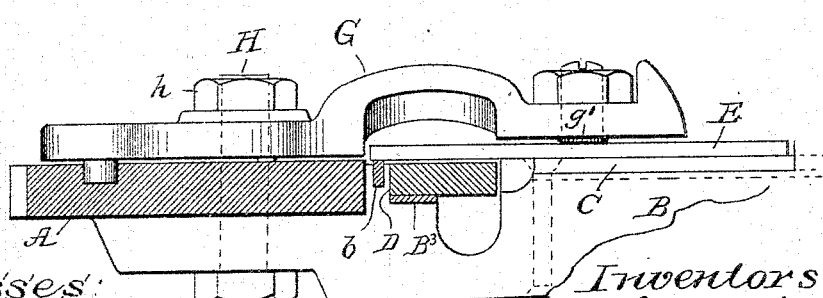

In the drawings Figure 1 is a top plan view of a portion of the cutting apparatus of a reaper or mower, showing the carrier, its guard fingers, reciprocating cutter bar, knives thereon, and adjusting and retaining devices for the latter. Fig. 2 is an enlarged transverse sectional view of the same. Fig. 3 is a detail plan and sectional view of a knife. Figs. 4, 5 and 6 are detail sectional views illustrating the manner of connecting the knives to the reciprocating bar. Fig. 7 is a sectional view illustrating a modification of the knife holding and adjusting devices.

In the drawings A is the carrier bar, B, B, B, the guide fingers secured thereto, and C, C, the ledger plates attached to the respective fingers as indicated in the drawings all substantially like an ordinary cutting apparatus.

D is the reciprocating cutter bar, or knife-carrying bar, resting upon, supported and guided by, the several fingers; and E, E, are the knives connected to said bar, one for each finger, as usual. These knives are preferably constructed as indicated in Fig. 3 being triangular in plan, sharpened on two edges, and hollowed or dished underneath so as to present narrow bearing or wearing surfaces to contact with their coacting ledger plates.

Each knife may be loosely connected at its rear edge to the bar D preferably by means of depending studs loosely engaging corresponding sockets or perforations in the bar as indicated in the drawings. As shown in Fig. 4 each stud is formed by a short sleeve F of hard metal secured to the knife by a rivet $f$ and engaging a corresponding opening in bar D. In Fig. 5 the stud F' is provided with a rivet head and secured thereby on the knife, and in Fig. 6 a washer $f'$ is riveted to the bar and enters a corresponding opening in the rear end of the knife. In fact various modifications may be made in this connection between the knife and bar provided that the knife can be lifted directly off or put on the bar. It will be observed that the knives are so loosely connected to the bar that they can slightly vibrate thereon vertically, but are moved laterally thereby. In order to prevent the knives jumping or jarring off the bar it is necessary to provide a retainer or holder therefor, and we use fixed devices mounted on bar A so that the weight of the moving parts is not increased.

The holders are independent but similar castings attached to the top of bar A at points intermediate fingers B, B, each holder lies transversely of bar A and is secured thereto by a bolt H passing through the bar and transfixing the holder near its center and secured by a nut $h$. The holder extends forwardly over bar D as shown, and its front end impinges upon the top of the adjoining knife so as to keep the latter upon the bar as is evident. The knives are thus removably connected to bar D and must reciprocate therewith, yet they have a certain amount of movement independent of each other and of the bar, sufficient to enable them to work in close shearing contact with their respective ledger plates, without either affecting the bar or any other knife thereon. By this means, no matter if the fingers or ledger plates be slightly out of line, or irregular, the knives co-operating therewith can self adjust themselves thereto. By removing any holder G, the knife can be taken off for sharpening, or to be replaced, without unshipping the bar D or disturbing other parts of the machine.

In order to insure the contact between the knives and their respective ledger plates, we preferably fulcrum the respective holders under bolts H and extend them in rear of the bolts, and tap through their rear ends, set screws I the lower unthreaded ends of which engage sockets in bar A, so as to prevent the holder oscillating horizontally or laterally. By properly turning screw I the holder is oscillated, and its front end lowered thus depressing the knife thereunder so as to hold its edges in sufficiently close contact with the edges of adjoining ledger plates to properly shear cut therewith. The ledger plates C are preferably dished or recessed in the top so that the edges stand above their centers, thereby affording a narrow wearing and frictional surface contacting with the knives. The knives being flat on top reciprocate easily under the holders. Rubbers $g, g$, of anti-friction metal or material are fixed to the ends of holders to contact with the knives, and anti-friction strips $b, b$, are placed in the fingers B, B, at rear of the bar D, and project slightly above the same and support the rear ends of the knives, which project slightly in rear of the bar D. Anti-friction bearing $B^3$ may be placed in the fingers beneath bar D also, as shown in Fig. 2. By this construction the friction of parts is almost confined to the shear edges of the knives and ledger plates. As shown in Fig. 7 the holder is provided with an adjusting bolt in its front end which impinges upon the knife, and by which the latter is held down and adjusted; an anti-friction washer $g'$ may be put on the lower end of this bolt. Preferably the bearings $B^3$ and washers $g'$ would be made of a frictionless substance or compound; such as "Holmes fibro-graphite." In fact various modifications may be made in the construction of the independently adjustable moving knives, and independent stationary holding and adjusting devices therefor, and we do not confine ourselves to the precise construction shown and described herein.

It is to be understood that although the removable knife is the better form, yet the shear principle can be obtained in a less practical form, by using the holders as described in connection with the ordinary rigidly connected knife the spring of the knives being sufficient to enable the holder to keep the knife in contact with the ledger plate at each tooth which is the main principle involved.

Our experiments have shown us that practically all mowers now made mainly cut by means of sharp knives severing the grass held by the fingers by a sweeping stroke in the air. Only when the knives are held down do they shear, while our mower cuts the grass by shearing it in conjunction with the ledger plates. To make the shear cut we find it is essential that the lower edges of the several knives must be kept in unyielding or rigid close contact with the ledger plates. Spring pressure is not effective as it permits the grass to be crowded in between the knife and ledger plates if weak; if strong they produce destructive friction. To obtain the shearing principle we use an adjustable holder at each knife for that knife alone, by which it can be positively kept in contact with the ledger plates. This is the main essential feature of the invention. A second is the employment of hollow knives. Lastly, the means of attaching and detaching the knives by which they are kept rigid, as to lateral individual motion, but have a slight vertical movement. By this means each knife can be accommodated to its ledger plate; is independent not only in removal but for substitution, as a broken knife can be replaced, without affecting the operation or adjustment of any other knife.

Having described our invention what we claim as new and desire to secure by Letters Patent is;—

1. The combination of a series of movable knives and stationary ledger plates or fingers, with stationary devices acting between said fingers for independently adjusting each knife and holding it in unyielding shearing contact with the ledger plates substantially as described.

2. The combination in a cutting apparatus of the finger bar, a reciprocating bar, a series of cutting knives carried thereby and the guard fingers; with devices attached to the finger bar and acting on said knives between said fingers for independently adjusting each knife in relation to its guard finger so as to cause it to shear cut therewith, without affecting the adjustment or operation of any other knife, substantially as specified.

3. The combination in a cutting apparatus of a reciprocating bar a series of independently removable knives connected thereto and movable therewith, and a series of stationary holders between said fingers, one for and acting on each knife, confining said knives to the bar, substantially as and for the purpose set forth.

4. The combination of a reciprocating bar, a series of independent knives loosely connected thereto, not longitudinally movable thereon but separately removable therefrom when lifted vertically from the bar and a series of stationary holders on the finger bar one for each knife adapted to keep the knives on the reciprocating bar by preventing vertical movement of the knives thereon, and means for adjusting said holders, substantially as described.

5. The combination of the horizontal reciprocating bar, knives loosely connected thereto and reciprocated thereby, but separately removable therefrom if lifted vertically thereof, and the guard fingers co-operating with said knives, with a stationary independent holder for each knife adapted to hold such knife down on the bar and also to regulate and maintain the contact between such knife and coacting guard fingers and means for independently adjusting said holders, substantially as and for the purpose specified.

6. The combination of the reciprocating bar, the knives loosely connected thereto and movable therewith but separately removable therefrom in a direction perpendicular to the bar, and the guard fingers or ledger plates; with an unyielding stationary holder, one for each knife attached to the finger bar between said fingers for both independently preventing vertical movement of said knives on the bar, and for independently regulating the contact between each of said knives and their coacting ledger plates, substantially as described.

7. In a cutting apparatus the combination of a reciprocating bar, a series of knives attached thereto, the finger bar and fingers coacting with said knives; with a stationary anti-friction slide bearing underlying and supporting the rear end of each knife, substantially as and for the purpose described.

8. The combination of the finger bar, the reciprocating bar, the pin rigidly connected thereto, the knives loosely and removably fitted on said pins and movable with said bar, the anti-friction slide supporting the rear of said knife, and the stationary devices connected to the finger bar for retaining said knives on said reciprocating bar, substantially as described.

9. The combination of the finger bar, the knife bar, the pins rigidly connected thereto, the knives fitting said pins, and an adjustable holder for each knife connected to the finger bar, having an anti-frictional contact with the knife, substantially as and for the purpose specified.

10. The combination of the finger bar and guard fingers, the horizontal reciprocating bar and independent knives loosely attached to said bar and independently removable therefrom in a vertical direction, with an independent and adjustable holder for each knife connected to the finger bar between adjoining guard fingers and overreaching its relative knife and having an anti-friction rubber in its end contacting the knife whereby said knife is kept on the bar and in shearing contact with the guard fingers, substantially as and for the purpose set forth.

11. An adjustable holder for the knives of mowing machines consisting of the head at one end for holding the knife down, an adjusting screw at the other end, and a fulcrum and bolt hole between said head and said screw, said bolt hole being between said screw and said fulcrum, substantially as specified.

12. The combination of a reciprocating bar, a series of knives removably and loosely connected thereto, a finger bar and a series of guard fingers thereon coacting with said bar; with an anti-friction slide bearing underneath and supporting the rear end of each knife, and means for holding each knife independently on the reciprocating bar, substantially as described.

13. The combination of the finger bar and a reciprocating cutter bar, a series of knives secured on the cutter bar against longitudinal movement but separately removable therefrom in a direction perpendicular to the bar; with stationary holders on the finger bar one for each knife which hold them in contact with the ledger plate and prevents their movement in a direction perpendicular to the bar, substantially as and for the purpose described.

14. The combination of the finger bar, the guard fingers and ledger plates, and the anti-friction bearings $b$; with the reciprocating bar the knives loosely attached thereto by studs and sockets, and the independent stationary castings for holding each of said knives on the bar and adjusting them, substantially as and for the purpose set forth.

In testimony that we claim the foregoing as our own we affix our signatures in presence of two witnesses.

WILLIAM ST. GEORGE ELLIOTT.
W. ST. G. ELLIOTT, JR.

Witnesses:
T. H. ALEXANDER,
ARTHUR E. DOWELL.